United States Patent [19]

Okudaira et al.

[11] Patent Number: 4,735,853
[45] Date of Patent: Apr. 5, 1988

[54] MAGNETIC RECORDING MEDIUM HAVING AN AMORPHOUS, NONMAGNETIC NICKEL-TUNGSTON-PHOSPHORUS UNDERLAYER

[75] Inventors: Hiroaki Okudaira; Hitoshi Oka; Masako Fujisawa, all of Yokohama; Yoshio Gobara, Hatano; Nobuo Nakagawa, Yokohama, all of Japan

[73] Assignee: Hitachi, Ltd., Tokyo, Japan

[21] Appl. No.: 863,503

[22] Filed: May 15, 1986

[30] Foreign Application Priority Data

May 15, 1985 [JP] Japan .................. 60-101291

[51] Int. Cl.4 .................................. H01F 10/26
[52] U.S. Cl. .................................. 428/336; 428/457; 428/694; 428/704; 428/900
[58] Field of Search ............. 428/694, 457, 900, 611, 428/663, 665, 680, 928, 336, 704

[56] References Cited

U.S. PATENT DOCUMENTS 4,224,381 9/1980 Patel et al. ............. 428/928
4,410,603 10/1983 Yamamori et al. ........ 428/611
4,603,091 7/1986 Mukasa et al. ........... 428/611
4,621,030 11/1986 Uesaka et al. ........... 428/611

FOREIGN PATENT DOCUMENTS 71524 5/1982 Japan .
42741 3/1983 Japan .

Primary Examiner—George F. Lesmes
Assistant Examiner—William M. Atkinson
Attorney, Agent, or Firm—Antonelli, Terry & Wands

[57] ABSTRACT

Disclosed is a magnetic recording medium in which an underlayer formed below a magnetic medium, in which a signal is written, is composed of a nickel alloy comprising 0.05 to 10 atom % of tungsten and 14 to 30 atom % of phosphorus. In this magnetic recording medium, the temperature for formation of magnetic medium and the temperature for formation of a protective film can be elevated over the levels adopted in the conventional techniques. Therefore, the magnetic characteristics and abrasion resistance can be improved. Furthermore, the magnetic recording medium is excellent in the mechanical strength and corrosion resistance. Accordingly, the reliability of the magnetic medium can be highly improved.

18 Claims, 1 Drawing Sheet

MAGNETIC RECORDING MEDIUM HAVING AN AMORPHOUS, NONMAGNETIC NICKEL-TUNGSTON-PHOSPHORUS UNDERLAYER

BACKGROUND OF THE INVENTION

The present invention relates to a magnetic recording medium. More particularly, the present invention relates to a magnetic recording medium which has excellent in the magnetic characteristics and reliability.

In order to meet the recent demand for a high recording density in a magnetic recording medium, especially a magnetic disk, development of a magnetic disk comprising a thin film magnetic medium has been made. A general structure of the magnetic disk is shown in FIG. 1. An underlayer 2 composed of a nonmagnetic material is formed on a substrate 1 composed of a nonmagnetic material such as aluminum, and a magnetic medium 3 and a protective film 4 are formed on the underlayer 2. Generally, the underlayer is an amorphous nickel-phosphorus alloy layer formed by electroless plating. As the magnetic medium, an iron oxide ($\gamma$-Fe$_2$O$_3$) layer formed by sputtering or a cobalt-phosphorus alloy layer formed by plating is used.

It is required that the underlayer should be nonmagnetic, should have a mechanical strength sufficient to resist the impingement between the magnetic head and the disk and should have a sufficient corrosion resistance in the environment where the disk is used. In connection with the nonmagnetic characteristic, it is important that the underlayer should not be magnetized by heating effected in the magnetic disk-forming step. As the temperature of magnetization, i.e. the temperature at which an amorphous alloy crystallizes to exhibit ferromagnetic properties, of the underlayer is elevated, it becomes possible to elevate the temperature for forming the magnetic medium and the protective layer, and therefore, a magnetic medium having further improved magnetic characteristics and a protective layer having further enhanced corrosion resistance and abrasion resistance can be obtained.

A nickel-phosphorus alloy ordinarily used for the underlayer is amorphous and nonmagnetic in an as-plated state, but if the alloy is heated, the alloy crystallizes at about 250° C. and is separated into nickel and a nickel-phosphorus compound (Ni$_3$P), with the result that the underlayer is magnetized by nickel which is a ferromagnetic material. Accordingly, in case of an underlayer composed of an amorphous nickel-phosphorus alloy, the temperature for forming the magnetic medium and the protective layer should be lower than 250° C., thereby making it difficult to impart excellent characteristics to the magnetic medium and the protecting layer. Moreover, the amorphous nickel-phosphorus alloy layer is insufficient in mechanical characteristics and corrosion resistance. More specifically, with an increase of the recording density, the flying height of the magnetic head is reduced and hence, the frequency of the impingement between the magnetic head and the disk is increased. In the case of the nickel-phosphorus alloy, since the tensile strength and hardness are low, the magnetic disk is readily damaged by the impingement. Furthermore, since the bit length as the recording unit is shortened with the increase of the recording density, even a very small defect owing to corrosion causes an error. Since the corrosion resistance of the nickel-phosphorus alloy is poor, the corrosion propagates even to the magnetic medium and the error is increased, resulting in reduction of the reliability of the disk.

As the prior art concerning the underlayer of a magnetic disk, there can be mentioned Japanese Patent Application Laid-Open Specification No. 33900/76. It is taught therein that addition of zinc or manganese to a nickel-phosphorus alloy is effective in improving the coercive force and the magnetic remanence of a magnetic medium formed on the underlayer. However, according to this conventional technique, no improvement is attained in the temperature of magnetization, mechanical characteristics or corrosion resistance.

SUMMARY OF THE INVENTION

It is a primary object of the present invention to solve the above-mentioned problem of the conventional technique and provide a magnetic recording medium comprising an underlayer having a high temperature of magnetization and excellent mechanical characteristics and corrosion resistance.

In accordance with the present invention, this object can be attained by a magnetic recording medium in which a nonmagnetic layer below a magnetic medium is composed of a nickel-tungsten-phosphorus alloy.

We researched the elevation of the temperature of magnetization and improvements in mechanical characteristics such as hardness, tensile strength and corrosion resistance by addition of a third element to a nickel-phosphorus alloy. As the result, it was found that if tungsten was added to a nickel-phosphorus alloy, the above-mentioned characteristics were improved with an increase of the amount of added tungsten. More specifically, the relation between the temperature of magnetization and the tungsten content in the nickel-tungsten-phosphorus alloy is as shown in FIG. 2, from which the effect brought about by addition of tungsten is apparent. It may be considered that this effect is due to the fact that electrons of phosphorus migrate to tungsten to strengthen the chemical bonding force between phosphorus and tungsten.

If the tungsten content is lower than 0.05 atom %, no substantial effect is attained by addition of tungsten, while if it is higher than 10 atom %, the formed layer is easily cracked. Accordingly, it is preferred that the tungsten content be 0.05 to 10 atom %, especially 0.1 to 5 atom %.

In order to render the nickel-tungsten-phosphorus alloy amorphous, it is indispensable that the phosphorus content should be at least 14 atom %. However, an alloy having a phosphorus content exceeding 30 atom % is difficult to prepare. Accordingly, it is preferred that the phosphorus content be 14 to 30 atom %.

It is sufficient if the underlayer of the nickel-tungsten-phosphorus alloy has a thickness necessary for supporting the magnetic medium and resisting a shock generated by impingement against the magnetic head. Namely, it is preferred that the thickness of the alloy layer be 5 to 200 $\mu$m, especially 10 to 100 $\mu$m.

The method for forming the underlayer of the nickel-tungsten-phosphorus alloy is not particularly critical, so far as the above-mentioned composition and thickness are obtained. For example, there may be adopted plating methods such as a chemical plating method and an electroplating method, and physical and chemical vapor deposition methods such as a sputtering method, a vacuum evaporation method and an ion plating method. In view of the layer-forming speed, the ease of formation of a thick film, the mass productivity and from the economical viewpoint, it is preferable to adopt plating methods.

Even if a fourth element such as copper, zinc, silver, gold, palladium, rhodium, manganese, molybdenum, rhenium, chromium, vanadium, titanium or boron is incorporated in an amount of 0.001 to 25 atom % in the nickel-tungsten-phosphorus alloy, the above-mentioned characteristics are not influenced, and the resulting alloy is excellent over the conventional nickel-phosphorus alloy in these characteristics. A magnetic medium formed on the underlayer of the nickel-tungsten-phosphorus alloy acts as a layer for forming a magnetized state corresponding to a writing signal and recording signal, and any of magnetic materials customarily used for known recording media, such as iron oxide, a cobalt-nickel alloy, a cobalt-phosphorus alloy, a cobalt-platinum alloy and a cobalt-nickel-phosphorus alloy, may be used without any limitation. For formation of this magnetic medium layer, there may be adopted any of physical and chemical vapor deposition methods such as a sputtering method and a vacuum evaporation method and plating methods such as a chemical plating method and an electroplating method.

Even if a layer composed of chromium, titanium, silicon oxide, copper, zinc, gold, platinum or the like is formed between the underlayer of the nickel-tungsten-phosphorus alloy and the magnetic medium and/or between the underlayer and the substrate, the above-mentioned characteristics of the underlayer of the nickel-tungsten-phosphorus alloy are not influenced at all.

As is apparent from the foregoing description, the magnetic recording medium of the present invention comprises in principle a nonmagnetic substrate composed of, for example, an aluminum alloy, an underlayer of the above-mentioned nickel-tungsten-phosphorus alloy formed on the nonmagnetic substrate, a magnetic medium layer formed on the underlayer and a protective film formed on the magnetic medium layer, and a layer of other material may be interposed between the substrate and the underlayer and/or between the underlayer and the magnetic medium layer.

Materials customarily used in ordinary magnetic recording media may be used for the nonmagnetic substrate and the protective film. As the material used for the protective film, there can be mentioned, for example, silicon oxide, carbon, chromium, rhodium, cobalt oxide, silicon nitride, silicon carbide and boron nitride.

DETAILED DESCRIPTION OF THE PREFERRED EMBODIMENTS

The present invention will now be described in detail with reference to the following examples.

EXAMPLE 1

Figure 1:
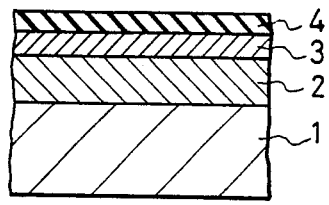
FIG. 1 is a sectional view of a general structure of a magnetic disk.
Figure 2:
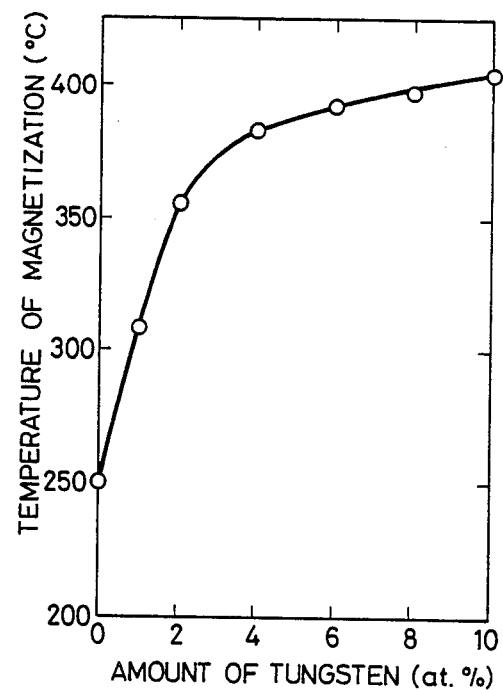
FIG. 2 is a graph illustrating the relationship between the tungsten content and the temperature of magnetization in a nickel-tungsten-phosphorus alloy.
Figure 3:
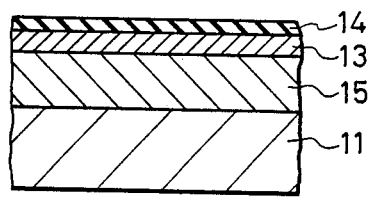
FIG. 3 is a sectional view of an example of the magnetic recording disk according to the present invention.

The structure of a typical instance of the magnetic disk according to the present invention is illustrated in FIG. 3. This magnetic disk was prepared in the following manner.

An aluminum alloy was punched in a doughnut-like shape, and both the surfaces were flattened and smoothened to form an aluminum alloy substrate 11. Then, the substrate 11 was subjected to degreasing and known zinc immersion, and an underlayer 15 of a nickel-tungsten-phosphorus alloy of the present invention is formed on the substrate 11 by electroless plating. The main components of the plating solution and the plating conditions were as shown in (a) of Table 1. The surface of the underlayer 15 was flattened and smoothed by mechanical polishing so that the surface roughness was about 0.01 $\mu$m. Then, a cobalt-phosphorus alloy magnetic medium layer 13 having a thickness of 0.07 $\mu$m was formed by electroless plating using a plating solution comprising as main components cobalt sulfate and sodium hypophosphorite. Then, a solution of an organic complex such as a silicon alcoholate was applied to the magnetic medium layer 13 by spin-coating, a heat treatment was carried out at 310° C. for 1 hour and a protective film 14 composed of silicon oxide was formed in a thickness of about 0.08 $\mu$m to prepare a magnetic disk.

The underlayer 15 of the nickel-tungsten-phosphorus alloy formed by the above-mentioned electroless plating method was amorphous and nonmagnetic and, as shown in Table 2, the tungsten content was 0.1 atom % and the phosphorus content was 16.2 atom %. Even after the underlayer 15 was heated at 320° C. for 1 hour, the underlayer 15 retained amorphous and nonmagnetic characteristics. Accordingly, even after the above-mentioned heat treatment, the underlayer 15 was naturally amorphous and nonmagnetic.

Since the heat treatment at 310° C. for 1 hour for formation of the protective film 14 was made possible, the abrasion resistance of this film could be improved. Namely, in an abrasion test where a saphire ball was pressed under a load of 30 g to the disk and the disk was rotated at a peripheral speed of 10 m/sec, the time required for damaging the magnetic medium by wearing of the protective film 14 was 30 minutes.

The nickel-tungsten-phosphorus alloy obtained in the present example was excellent in corrosion resistance, and when the alloy was immersed in a 1N aqueous solution of hydrochloric acid, the corrosion speed was as low as 1.0 mm/year. Furthermore, the alloy had excellent mechanical characteristics, and the tensile strength was 270 Kg/cm$^2$ and the Vickers hardness was 580. In an impact resistance test where a sapphire ball having a diameter of 5 mm was let to fall on the disk from a height of 3 m, the depth of the formed compression mark was 0.8 $\mu$m. Accordingly, the impact resistance of the nickel-tungsten-phosphorus alloy of the present example against the impingement to the magnetic head was excellent over that of the conventional nickel-phosphorus alloy. Furthermore, when the alloy was subjected to heating and cooling, formation of neither blisters nor cracks was observed at all.

By elevation of the temperature of magnetization, not only the above-mentioned improvement in the characteristics of the protective film 14 but also an improvement of the magnetic characteristics of the magnetic medium could be attained. More specifically, it became possible to heat-treat a magnetic medium of iron oxide or the like formed by sputtering, at 300° C. for 3 hours, and such excellent magnetic characteristics as a magnetic remanence of 2600 G, a coercive force of 600 Oe and a squareness ratio of 0.80 were obtained.

EXAMPLES 2 through 8

A nickel-tungsten-phosphorus alloy underlayer was formed by electroless plating on an aluminum alloy substrate processed in the same manner as in Example 1. The main components of the plating solution and the plating conditions in Examples 2 through 8 are shown in (b) through (h) of Table 1. In the same manner as in Example 1, the magnetic medium layer and the protective film were formed on the underlayer. With respect to each of the obtained nickel-tungsten-phosphorus alloys, the tungsten and phosphorus contents, the temperature of magnetization and the corrosion resistance were determined. The obtained results are shown in (2) through (8) of Table 2.

TABLE 1

|  |  | a | b | c | d | e | f | g | h |
|---|---|---|---|---|---|---|---|---|---|
| Composition of Plating Solution | nickel sulfate (g/l) | 7 | 7 | 7 | 7 | 7 | 7 | 7 | 7 |
|  | sodium citrate (g/l) | 20 | 44 | 60 | 60 | 60 | 20 | 60 | 44 |
|  | ammonium sulfate (g/l) | 30 | 30 | 30 | 0 | 0 | 30 | 0 | 30 |
|  | sodium tungstate (g/l) | 2 | 7.6 | 14 | 14 | 18 | 5 | 20 | 7.6 |
|  | sodium hypophosphite (g/l) | 7 | 7 | 7 | 7 | 7 | 10 | 7 | 10 |
| Plating Conditions | temperature (°C.) of plating solution | 90 | 90 | 90 | 90 | 90 | 85 | 95 | 90 |
|  | pH value of plating solution | 5.7 | 7.0 | 9.0 | 10.0 | 8.5 | 9.5 | 8.0 | 9.0 |

TABLE 2

| Example No. | Content (atom %) W | Content (atom %) P | Thickness (μm) | Plating conditions (Table 1) | Temp. of Magnetization (°C.) | Corrosion Resistance (mm/year) | Tensile Strength (Kg/mm$^2$) | Cracks or Blisters |
|---|---|---|---|---|---|---|---|---|
| 1 | 0.1 | 16.2 | 40 | a | 320 | 1.0 | 270 | not observed |
| 2 | 0.6 | 19.1 | 100 | b | 340 | 0.8 | 280 | " |
| 3 | 1.3 | 17.0 | 30 | c | 350 | 0.5 | 300 | " |
| 4 | 2.6 | 20.5 | 70 | d | 370 | 0.3 | 300 | " |
| 5 | 4.9 | 14.1 | 10 | e | 385 | 0.1 | 310 | " |
| 6 | 0.3 | 24.5 | 60 | f | 330 | 0.9 | 280 | " |
| 7 | 9.9 | 18.7 | 40 | g | 390 | 0.1 | 310 | " |
| 8 | 1.1 | 29.8 | 50 | h | 350 | 0.6 | 290 | " |

In each of Examples 2 through 8, the tungsten content was higher than in Example 1, and the temperature of magnetization was elevated and the corrosion resistance and tensile strength were further improved. Furthermore, the Vickers hardness was increased to 550 to 600. Moreover, in the above-mentioned impact resistance test, the depth of the compression mark was 0.5 to 1.4 μm and the obtained results were excellent over those obtained in the nickel-phosphorus alloy. By dint of the improvements in these characteristics, the magnetic characteristics of the magnetic medium and the abrasion resistance and corrosion resistance of the protective film could be enhanced, and the impact resistance against the impingement to the magnetic head could be increased.

In an alloy layer having a tungsten content higher than 11 atom %, a number of fine cracks were formed and the layer could not be used as the underlayer.

In addition to underlayer thicknesses shown in Table 2, thicknesses of 1, 2, 3, 5, 8, 200, 300 and 400 μm were formed under conditions of Example 4 and were examined. It was found that with thicknesses of 5, 8 and 200 μm, an excellent impact resistance was attained as in Example 1, but with thicknesses of 1, 2 and 3 μm, the impact resistance was lower than that attained in Example 1, though the impact resistance was superior to that of the nickel-phosphorus alloy. With thicknesses of 300 and 400 μm, although a very long time was necessary for formation of the underlayer, the impact resistance was similar to that attained with a thickness of 200 μm.

EXAMPLE 9

A nickel-tungsten-phosphorus alloy underlayer having a thickness of 30 μm was formed by electroplating on an aluminum alloy substrate processed in the same manner as in Example 1. The plating solution used comprised 100 g/l of nickel sulfate, 5 g/l of sodium tungstate, 50 g/l of phosphoric acid and 40 g/l of phosphorous acid, and the temperature of the plating solution was 80° C., the pH value of the plating solution was 1.0 and the current density was 10 A/dm$^2$. In the same manner as in Example 1, the surface of the underlayer was polished and a magnetic medium layer of a cobalt-nickel-phosphorus alloy was formed by electroplating. Then, a protective film of silicon oxide was formed in the same manner as in Example 1. The thickness of the magnetic medium layer was 0.04 μm and the thickness of the protective layer was 0.05 μm.

The so-formed nickel-tungsten-phosphorus alloy underlayer was amorphous and nonmagnetic, and the tungsten content was 0.1 atom % and the phosphorus content was 24 atom %. Even after the underlayer was heated at 340° C. for 1 hour, the underlayer was amorphous and nonmagnetic, and therefore, the underlayer retained amorphous and nonmagnetic characteristics even after the heat treatment for formation of the protective film. The corrosion resistance was such that the corrosion speed in 1N hydrochloric acid was 0.7 mm/year. The mechanical characteristics of the underlayer were so excellent that the tensile strength was 280 Kg/mm$^2$ and the Vickers hardness was 610. When the underlayer was subjected to heating and cooling, formation of neither blisters nor cracks was observed.

EXAMPLES 10 through 18

An underlayer of a nickel-tungsten-phosphorus alloy further comprising molybdenum, chromium, boron or copper was formed by electroless plating on an aluminum alloy substrate processed in the same manner as in Example 1. The plating solution used was formed by adding 0.1 or 1.5 g/l of sodium molybdate, 40 g/l of chromium potassium sulfate, 1 or 4 g/l of dimethylamine/borane or 28 g/l of copper sulfate to the plating solution (d) shown in Table 1. The temperature of the plating solution was 60° to 90° C. and the pH value of the plating solution was 7 to 10. In the same manner as in Example 1, a magnetic medium layer having a thickness of 0.03 to 0.12 μm and a protective film having a thickness of 0.05 to 0.2 μm were formed. The composition of the formed alloy, the temperature of magnetization and the corrosion resistance and other characteristics were as shown in (10) through (18) of Table 3.

TABLE 3

| Example No. | Content (atom %) | | | Thickness (μm) | Temp. of Magnetization (°C.) | Corrosion Resistance (mm/year) | Tensile strength (Kg/mm²) | Formation of Cracks or Blisters |
|---|---|---|---|---|---|---|---|---|
| | W | P | Other | | | | | |
| 10 | 2.1 | 17.7 | Mo 0.5 | 25 | 373 | 0.5 | 288 | not observed |
| 11 | 1.8 | 16.2 | Mo 3.7 | 37 | 382 | 0.4 | 292 | " |
| 12 | 2.6 | 20.5 | Mo 0.01 | 45 | 371 | 0.4 | 300 | " |
| 13 | 1.2 | 18.6 | Mo 25.0 | 10 | 387 | 0.4 | 295 | " |
| 14 | 1.6 | 19.8 | Cr 5.4 | 33 | 366 | 0.1 | 291 | " |
| 15 | 2.5 | 20.3 | B 0.05 | 30 | 370 | 0.3 | 305 | " |
| 16 | 2.5 | 22.7 | B 4.6 | 18 | 352 | 0.6 | 318 | " |
| 17 | 2.4 | 18.1 | B 25.2 | 41 | 347 | 0.7 | 324 | " |
| 18 | 2.2 | 23.6 | Cu 8.9 | 29 | 338 | 1.0 | 260 | " |

In the nickel-tungsten-phosphorus alloy, by incorporation of molybdenum, the temperature of magnetization was much elevated as compared with that of the conventional nickel-phosphorus alloy, and by incorporation of chromium, the corrosion resistance was improved. Furthermore, by addition of boron, the tensile strength was improved and the Vickers hardness was increased to 610 to 680. By incorporation of copper, the tensile strength was improved. These alloys were excellent over the conventional nickel-phosphorus alloys in other characteristics. Moreover, the depth of the compression mark in the impact resistance test was 0.6 to 1.8 μm and the obtained results were better than those obtained in the conventional nickel-phosphorus alloy. By dint of improvements in these characteristics, the magnetic characteristics of the magnetic medium, the corrosion resistance and corrosion resistance of the protective film and the impact resistance against impingement of the magnetic head could be enhanced.

COMPARATIVE EXAMPLE 1

An underlayer of a nickel-phosphorus alloy having a thickness of 40 μm was formed by electroless plating on an aluminum alloy substrate processed in the same manner as in Example 1. A commercially available nickel-phosphorus electroless plating solution was used as the plating solution. The temperature of the plating solution was 90° C. and the pH value of the plating solution was 6.3. The surface was polished in the same manner as in Example 1, and a cobalt-phosphorus alloy magnetic medium layer was formed by electroless plating, and a protective film composed of silicon oxide was then formed. The heat treatment was carried out at 230° C. for 1 hour.

The so-obtained nickel-phosphorus alloy was amorphous and nonmagnetic, and the phosphorus content was 21.3 atom %. When the alloy layer was heated at 250° C. for 1 hour, the layer was crystallized and magnetized to show a saturation magnetic flux density of 830 G. Accordingly, for formation of the protective film, the heat treatment had to be carried out at 230° C. for 1 hour. When the abrasion resistance of the protective film was evaluated in the same manner as in Example 1, the time required for damaging the magnetic medium by wearing of the protective film was 10 minutes, and the abrasion resistance was poorer than in the nickel-tungsten-phosphorus alloy. Moreover, the corrosion resistance was poor. Namely, when the protective film was immersed in 1N hydrochloric acid, the corrosion speed was as high as 3.1 mm/year. The mechanical properties were inferior to those in the nickel-tungsten-phosphorus alloy, and the tensile strength was 230 Kg/mm² and the Vickers hardness was 510. In the above-mentioned impact test, the depth of the compression mark was as large as 3.2 μm, and the impact resistance was poorer than in the nickel-tungsten-phosphorus alloy.

In the nickel-phosphorus alloy, since the temperature of magnetization was low as pointed out above, the heat treatment for formation of the magnetic medium of iron oxide had to be carried out at 220° C. for 3 hours, and the magnetic characteristics were so poor that the magnetic remanence was 1900 G, the coercive force was 450 Oe and the squareness ratio was 0.67.

As is apparent from the foregoing description, since a nickel-tungsten-phosphorus alloy is used for the underlayer, the temperature of magnetization can be elevated to 320° C. or higher from about 250° C. of the conventional nickel-phosphorus alloy. Accordingly, the temperature of the heat treatment for formation of the magnetic medium can be elevated, and a magnetic medium excellent in the magnetic remanence, coercive force and squareness ratio can be formed stably. Moreover, since the temperature of the heat treatment for formation of the protective film can be elevated, the abrasion resistance of the protective film is increased to a level 2 to 4 times the level attained in the conventional nickel-phosphorus alloy, and the reliability of the magnetic disk can be enhanced.

Furthermore, the mechanical characteristics such as tensile strength and hardness of the underlayer can be improved by about 20% or more as compared with those of the nickel-phosphorus alloy, and therefore, the durability against the impingement to the magnetic head can be improved and also the corrosion resistance is highly improved over that attained in the conventional nickel-phosphorus alloy, with the result that the reliability of the magnetic disk can be greatly improved.

What is claimed is:

1. A magnetic recording medium comprising a magnetic medium and an underlayer formed below the magnetic medium, wherein the underlayer is composed of an amorphous and non-magnetic alloy comprising 0.05 to 10 atom % of tungsten and 14 to 30 atom % of phosphorus, with the balance being nickel.

2. A magnetic recording medium as set forth in claim 1, wherein the underlayer is composed of an alloy comprising 0.1 to 5 atom % of tungsten and 14 to 30 atom % of phosphorus, with the balance being nickel.

3. A magnetic recording medium as set forth in claim 1, wherien said magnetic medium layer is composed of a material selected from the group consisting of iron oxide, a cobalt-nickel alloy, a cobalt-phosphorus alloy, a cobalt-platinum alloy and a cobalt-nickel-phosphorus alloy.

4. A magnetic recording medium as set forth in claim 1, further comprising a layer composed of a material selected from the group consisting of chromium, titanium, silicon oxide, copper, zinc, gold and platinum formed between said magnetic medium and said underlayer.

5. A magnetic recording medium as set forth in claim 1, wherein the thickness of the underlayer is 5 to 200 $\mu$m.

6. A magnetic recording medium as set forth in claim 5, wherein the thickness of the underlayer is 10 to 100 $\mu$m.

7. A magnetic recording medium as set forth in claim 1, wherein the alloy further comprises at least one element selected from the group consisting of copper, zinc, silver, gold, palladium, rhodium, manganese, molybdenum, rhenium, chromium, vanadium, titanium and boron.

8. A magnetic recording medium as set forth in claim 3, wherein said at least one element is incorporated in said alloy in an amount of 0.001 to 25 atom %.

9. A magnetic recording medium as set forth in claim 8, wherein said at least one element is selected from the group consisting of chromium, boron and copper.

10. A magnetic recording medium comprising a nonmagnetic substrate, an underlayer formed on the substrate, a magnetic medium layer formed on the underlayer and a protective film formed on the magnetic medium layer, wherein the underlayer is composed of an amorphous and non-magnetic alloy comprising 0.05 to 10 atom % of tungsten and 14 to 30 atom % of phosphorus, with the balance being nickel.

11. A magnetic recording medium as set forth in claim 10, wherein said nonmagnetic substrate is composed of aluminum.

12. A magnetic recording medium as set forth in claim 10, wherein said magnetic medium layer is composed of a material selected from the group consisting of iron oxide, a cobalt-nickel alloy, a cobalt-phosphorus alloy, a cobalt-platinum alloy and a cobalt-nickel-phosphorus alloy.

13. A magnetic recording medium as set forth in claim 10, wherein said protective film is composed of a material selected from the group consisting of silicon oxide, carbon, chromium, rhodium, cobalt oxide, silicon nitride, silicon carbide and boron nitride.

14. A magnetic recording medium comprising a nonmagnetic substrate, an underlayer formed on the substrate, a magnetic medium layer formed on the underlayer and a protective film formed on the magnetic medium layer, wherein the underlayer is composed of an amorphous and non-magnetic alloy comprising 0.05 to 10 atom % of tungsten, 14 to 30 atom % of phosphorus, 0.001 to 25 atom % of at least one element selected from the group consisting of copper, zinc, silver, gold, palladium, rhodium manganese, molybdenum, rhenium, chromium, vanadium, titanium and boron, with the balance consisting essentially of nickel.

15. A magnetic recording medium as set forth in claim 14, wherein said at least one element is selected from the group consisting of chromium, boron and copper.

16. A magnetic recording medium as set forth in claim 14, wherein said nonmagnetic substrate is composed of aluminum.

17. A magnetic recording medium as set forth in claim 14, wherein the magnetic medium layer is composed of a material selected from the group consisting of iron oxide, a cobalt-nickel alloy, a cobalt-phosphorus alloy, a cobalt-platinum alloy and a cobalt-nickel-phosphorus alloy.

18. A magnetic recording medium as set forth in claim 14, wherein said protective film is composed of a material selected from the group consisting of silicon oxide, carbon, chromium, rhodium, cobalt oxide, silicon nitride, silicon carbide and boron nitride.

* * * * *